United States Patent
Chang et al.

(10) Patent No.: US 10,012,147 B2
(45) Date of Patent: Jul. 3, 2018

(54) APPARATUS AND METHOD FOR AIR PARTICLE SEPARATOR IN GAS TURBINE ENGINE

(71) Applicant: United Technologies Corporation, Farmington, CT (US)

(72) Inventors: Hoyt Y. Chang, Manchester, CT (US); Shayan Ahmadian, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 197 days.

(21) Appl. No.: 14/827,892

(22) Filed: Aug. 17, 2015

(65) Prior Publication Data
US 2017/0051669 A1  Feb. 23, 2017

(51) Int. Cl.
| | |
|---|---|
| *F02C 7/05* | (2006.01) |
| *F01D 25/32* | (2006.01) |
| *F02C 7/052* | (2006.01) |
| *F02C 3/04* | (2006.01) |

(52) U.S. Cl.
CPC ............... *F02C 7/05* (2013.01); *F01D 25/32* (2013.01); *F02C 3/04* (2013.01); *F02C 7/052* (2013.01); *F05D 2220/32* (2013.01); *F05D 2240/35* (2013.01); *F05D 2250/324* (2013.01); *F05D 2260/607* (2013.01); *Y02T 50/675* (2013.01)

(58) Field of Classification Search
CPC .... F02C 7/05; F02C 7/052; F02C 3/04; F01D 25/32; F05D 2260/607
See application file for complete search history.

(56) References Cited

U.S. PATENT DOCUMENTS

| | | | | |
|---|---|---|---|---|
| 4,466,239 | A * | 8/1984 | Napoli | F01D 5/082 415/116 |
| 5,039,317 | A | 8/1991 | Thompson et al. | |
| 5,123,240 | A * | 6/1992 | Frost | F02K 7/075 244/53 B |
| 5,725,180 | A * | 3/1998 | Chamay | B64D 33/02 244/53 B |
| 6,250,068 | B1 * | 6/2001 | Tajima | F01D 25/02 60/803 |
| 6,647,708 | B2 * | 11/2003 | Bornhoft | F02C 3/13 60/226.1 |
| 7,770,375 | B2 | 8/2010 | Alvanos et al. | |
| 8,092,145 | B2 | 1/2012 | Martel et al. | |
| 8,561,411 | B2 | 10/2013 | Dibenedetto | |
| 2007/0144139 | A1 | 6/2007 | Kawamoto et al. | |
| 2012/0000168 | A1 | 1/2012 | Chaudhari et al. | |
| 2012/0070271 | A1 * | 3/2012 | Urban | F02C 6/08 415/145 |
| 2012/0233973 | A1 | 9/2012 | Sedillo | |

(Continued)

OTHER PUBLICATIONS

European Search Report Application No. EP 16 18 4548.

*Primary Examiner* — Steven Sutherland
(74) *Attorney, Agent, or Firm* — Cantor Colburn LLP (57) ABSTRACT

An engine and particle decelerator is provided herein. The engine having: an inlet opening for directing air towards a compressor of the engine; and a particle decelerator located between the inlet opening and the compressor such that air travelling towards the compressor from the inlet opening must travel through the particle decelerator and wherein an area of the particle decelerator is greater than an inlet and an outlet of the particle decelerator.

19 Claims, 10 Drawing Sheets

(56) References Cited

U.S. PATENT DOCUMENTS

2013/0149100 A1\* 6/2013 Lawlor ................... F02C 3/00
 415/1
2015/0040535 A1 2/2015 Judd et al.
2017/0051669 A1 2/2017 Chang et al.

\* cited by examiner

APPARATUS AND METHOD FOR AIR PARTICLE SEPARATOR IN GAS TURBINE ENGINE

BACKGROUND

This disclosure relates to gas turbine engines, and more particularly to an apparatus and method for removing air particles and/or objects from a gas turbine engine.

Sand and/or other particles and/or objects entering or travelling thorough a gas turbine can reduce the life of parts in service by erosion and as well as thermos chemical-mechanical degradation (CMAS attack).

Accordingly, it is desirable to remove the particles and/or objects from the air/gas path of a gas turbine engine.

BRIEF DESCRIPTION

In one embodiment, an engine is provided, the engine having: an inlet opening for directing air towards a compressor of the engine; and a particle decelerator located between the inlet opening and the compressor such that air travelling towards the compressor from the inlet opening must travel through the particle decelerator and wherein an area of the particle decelerator is greater than an inlet and an outlet of the particle decelerator.

In addition to one or more of the features described above, or as an alternative to any of the foregoing embodiments, further embodiments may include an engine wherein the engine is a gas turbine engine and the gas turbine engine may further comprise a fan for directing the air to the compressor and wherein the engine may have a primary air flow path from the fan to the particle decelerator and a secondary air flow path from the fan and away from the particle decelerator.

In addition to one or more of the features described above, or as an alternative to any of the foregoing embodiments, further embodiments may include a transition area in the area of the particle decelerator and the transition area may be located between the inlet and the outlet of the particle decelerator and wherein the area of the particle decelerator may be an annular area located about an axis of the engine.

In addition to one or more of the features described above, or as an alternative to any of the foregoing embodiments, further embodiments may include an opening located in an outer shell of the particle decelerator, and a door for sealing the opening in the outer shell of the particle decelerator.

In addition to one or more of the features described above, or as an alternative to any of the foregoing embodiments, further embodiments may include the particle decelerator being configured such that the inlet is offset from the outlet such that an air flow path from the inlet is offset from the outlet.

In addition to one or more of the features described above, or as an alternative to any of the foregoing embodiments, further embodiments may include a transition area located between the inlet and the outlet of the particle decelerator.

In addition to one or more of the features described above, or as an alternative to any of the foregoing embodiments, further embodiments may include an opening located in an outer shell of the particle decelerator, and a door for sealing the opening in the outer shell of the particle decelerator and wherein there is no pressure loss of the air travelling from inlet to the outlet of the particle decelerator.

In addition to one or more of the features described above, or as an alternative to any of the foregoing embodiments, the engine in accordance with further embodiments may be a gas turbine engine and the gas turbine engine may further comprise a fan for directing the air to the compressor and wherein the engine may further comprise a second particle decelerator located between a combustor and a turbine of the gas turbine engine such that air travelling towards the turbine from the combustor must travel through the second particle decelerator and wherein an area of the second particle decelerator is greater than an inlet and an outlet of the second particle decelerator.

In addition to one or more of the features described above, or as an alternative to any of the foregoing embodiments, further embodiments may include a primary air flow path from the fan to the particle decelerator and a secondary air flow path from the fan and away from the particle decelerator.

In addition to one or more of the features described above, or as an alternative to any of the foregoing embodiments, the area of the particle decelerator in accordance with further embodiments may further comprise a transition area located between the inlet and the outlet of the particle decelerator and the second particle decelerator may further comprise a transition area located between the inlet and the outlet of the second particle decelerator and wherein the area of the particle decelerator may be an annular area located about an axis of the engine.

In addition to one or more of the features described above, or as an alternative to any of the foregoing embodiments, the particle decelerator in accordance with further embodiments may further comprise an opening located in an outer shell of the particle decelerator, and a door for sealing and closing the opening in the outer shell of the particle decelerator and the second particle decelerator may further comprise an opening located in an outer shell of the second particle decelerator, and a door for sealing the opening in the outer shell of the second particle decelerator.

In addition to one or more of the features described above, or as an alternative to any of the foregoing embodiments, the particle decelerator may be configured such that the inlet of the particle decelerator is offset from the outlet of the particle decelerator such that an air flow path from the inlet of the particle decelerator is offset from the outlet of the particle decelerator and the second particle decelerator may be configured such that the inlet of the second particle decelerator is offset from the outlet of the second particle decelerator such that an air flow path from the inlet of the second particle decelerator is offset from the outlet of the second particle decelerator.

In addition to one or more of the features described above, or as an alternative to any of the foregoing embodiments, the area of the particle decelerator and the area of the second particle decelerator may further comprise a transition area located between the inlet and the outlet of the particle decelerator and the second particle decelerator.

In addition to one or more of the features described above, or as an alternative to any of the foregoing embodiments, the particle decelerator may further comprise an opening located in an outer shell of the particle decelerator, and a door for sealing the opening in the outer shell of the particle decelerator and the second particle decelerator may further comprise an opening located in an outer shell of the second particle decelerator, and a door for sealing the opening in the outer shell of the second particle decelerator and wherein there is no pressure loss of the air travelling from inlet to the outlet of the particle decelerator and the second particle decelerator.

In another embodiment, an engine is provided, the having: a combustor for directing air towards a turbine of the gas turbine engine; and a particle decelerator located between the combustor and the turbine such that air travelling towards the turbine from the combustor must travel through the particle decelerator and wherein an area of the particle decelerator is greater than an inlet and an outlet of the particle decelerator.

In addition to one or more of the features described above, or as an alternative to any of the foregoing embodiments, the engine may be a gas turbine engine and the area of the particle decelerator further comprises a transition area located between the inlet and the outlet of the particle decelerator.

In addition to one or more of the features described above, or as an alternative to any of the foregoing embodiments, the particle decelerator may further comprise an opening located in an outer shell of the particle decelerator, and a door for sealing the opening in the outer shell of the particle decelerator.

In addition to one or more of the features described above, or as an alternative to any of the foregoing embodiments, the particle decelerator may be configured such that the inlet is offset from the outlet such that an air flow path from the inlet is offset from the outlet and wherein the area of the particle decelerator further comprises a transition area located between the inlet and the outlet of the particle decelerator.

In another embodiment, a method for removing at least one of particles and objects from an air flow path of an engine is provided. The method including the steps of: directing air from an inlet opening of the engine towards a compressor of the engine, wherein a particle decelerator is located in the engine; and decelerating a velocity of at least one of particles and objects located in the air travelling in the particle decelerator such that at least one of the particles and objects are retained in the particle decelerator.

In addition to one or more of the features described above, or as an alternative to any of the foregoing embodiments, the engine may be a gas turbine engine and the particle decelerator may be located between a fan and the compressor of the gas turbine engine and the gas turbine engine may further comprise a second particle decelerator located between a combustor and a turbine of the gas turbine engine, and the method may further include the steps of: directing air from the combustor of the gas turbine engine towards the turbine of the gas turbine engine; and decelerating a velocity of at least one of particles and objects located in the air travelling in either the particle decelerator or the second particle decelerator such that at least one of the particles and objects are retained in the particle decelerator or the second particle decelerator, and wherein there is no pressure loss in the air traveling through the first particle decelerator and the second particle decelerator.

In addition to one or more of the features described above, or as an alternative to any of the foregoing embodiments, the engine may be an engine suitable for use in an aircraft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various embodiments of the present disclosure are related to an apparatus and method for removing particles from a gas turbine engine and a gas turbine engine employing the apparatus and method for removing said particles.

Figure 1:
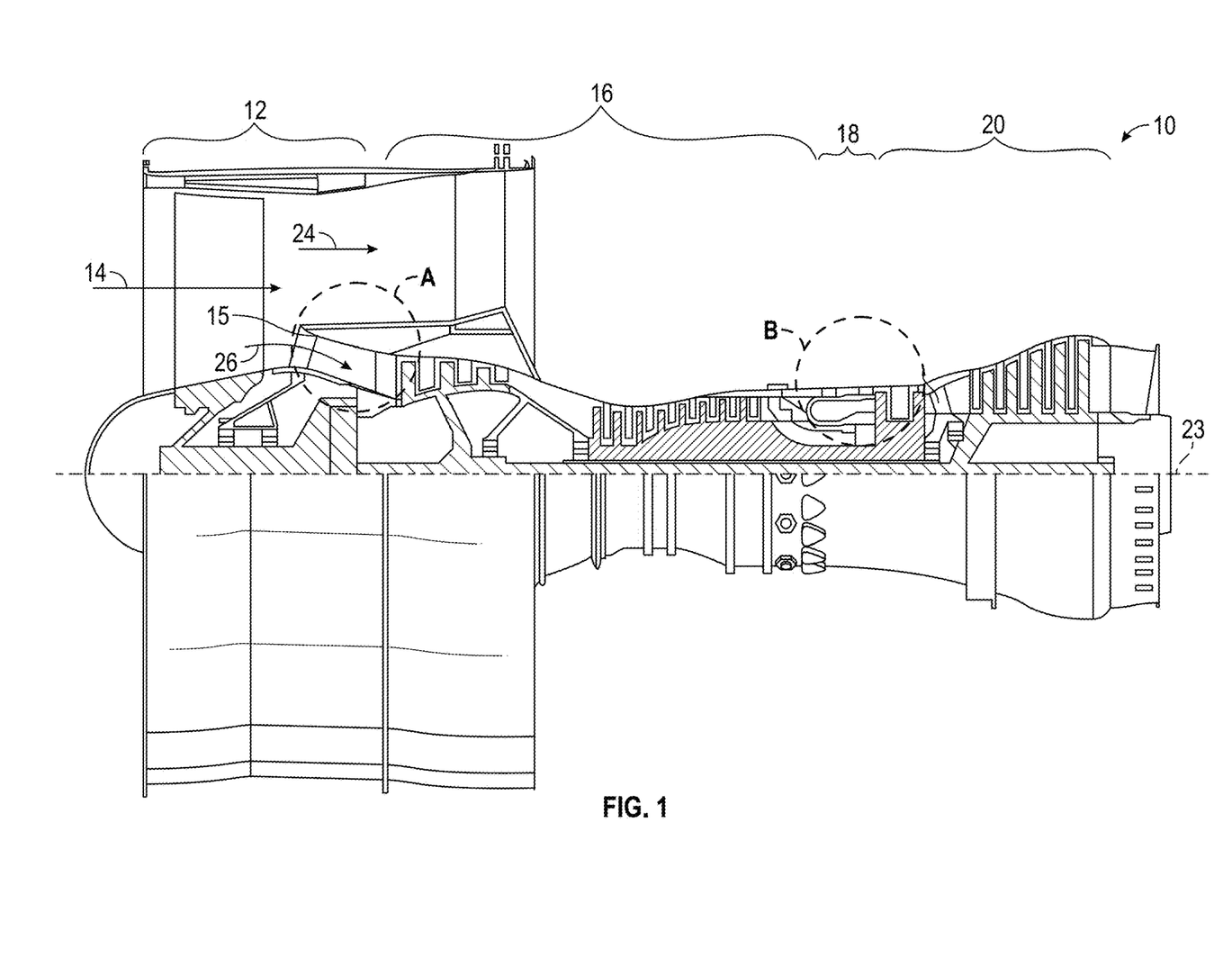
FIG. 1 is a partial cross-sectional schematic illustration of a gas turbine engine.

FIG. 1 is a partial cross-sectional schematic illustration of a gas turbine engine or engine 10. Although, a specific gas turbine engine is illustrated in FIG. 1 various embodiments of the present disclosure are contemplated for use in any engine wherein an apparatus and method for removing at least one particles, objects, foreign objects and combinations thereof would be desired. Non-limiting examples of such engines include but not limited to the following: turbofan engines, turbojet engines, turboshaft, afterburning turbojet engines, ramjet engines as well as any other equivalent engine wherein the apparatus and methods for removing particles from a fluid stream may be employed according to various embodiments of the present disclosure. Still further, various embodiments of the present disclosure are contemplated for use in any engine that may be suitable for use in an aircraft wherein an apparatus and method for removing particles would be desired. The gas turbine engine 10 of FIG. 1 generally has a fan 12 through which ambient air is propelled in the direction of arrow 14 towards an inlet or inlet opening 15 that directs the air towards a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10.

The gas turbine engine 10 may further comprise a low pressure compressor located in front of a high pressure compressor and a high pressure turbine located in front of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine.

Figure 2:
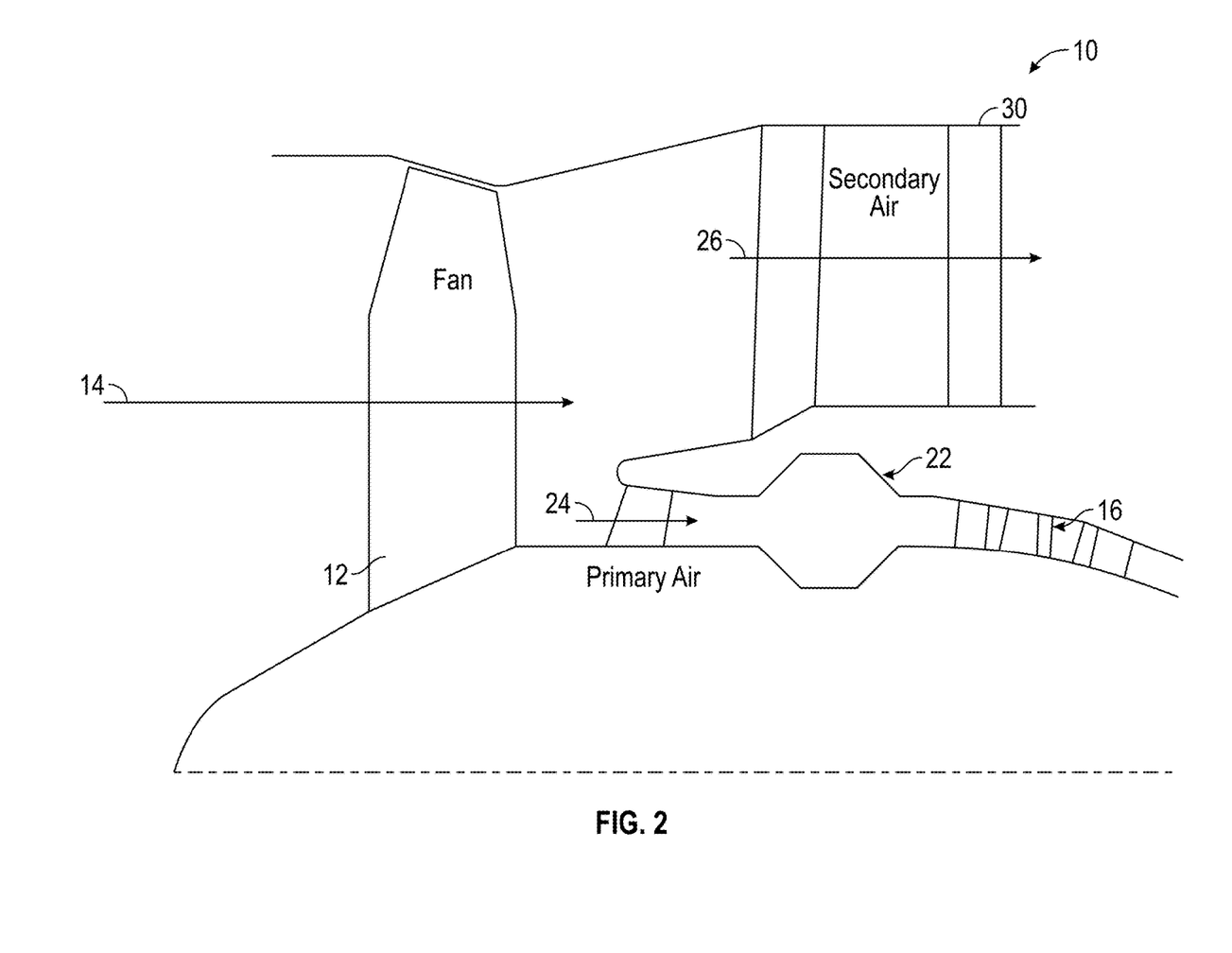
FIG. 2 is a partial cross-sectional view of a gas turbine engine illustrating a particle decelerator in accordance with an embodiment of the disclosure.

FIG. 2 illustrates a portion of the gas turbine engine 10 and a particle decelerator 22 for use with the gas turbine engine 10 in accordance with an embodiment of the disclosure. In one embodiment, particle decelerator 22 may be configured as an annular area disposed about a center line or axis 23 of the gas turbine engine 10. More particularly and as illustrated in FIG. 2, the particle decelerator 22 is located downstream of the fan 12 and/or the inlet 15 such that air travelling in the direction of arrow 14 is received in particle decelerator 22. In one embodiment, the particle decelerator 22 may be located in the area "A" depicted in FIG. 1. As illustrated, the air from fan 12 may be divided into a primary air flow path 24 and a secondary air flow path 26, wherein the primary air flow path 24 is directed into particle decelerator 22 via an inlet conduit or passage 28 while the secondary air flow path 26 is received by a passage 30. The particle decelerator 22 is configured to capture particles and/or objects or foreign objects located or entrained in the air as it flows into the engine 10 in the direction of arrows 14 and 26. In other words and in one embodiment, particle decelerator 22 is configured to capture particles and/or objects already located in the air prior to it entering the engine. As used herein, particle decelerator refers in a non-limiting fashion to an area configured to slow the velocity particles and/or objects traveling in an air path passing into the particle decelerator such that they are captured in the particle decelerator.

Figure 3:
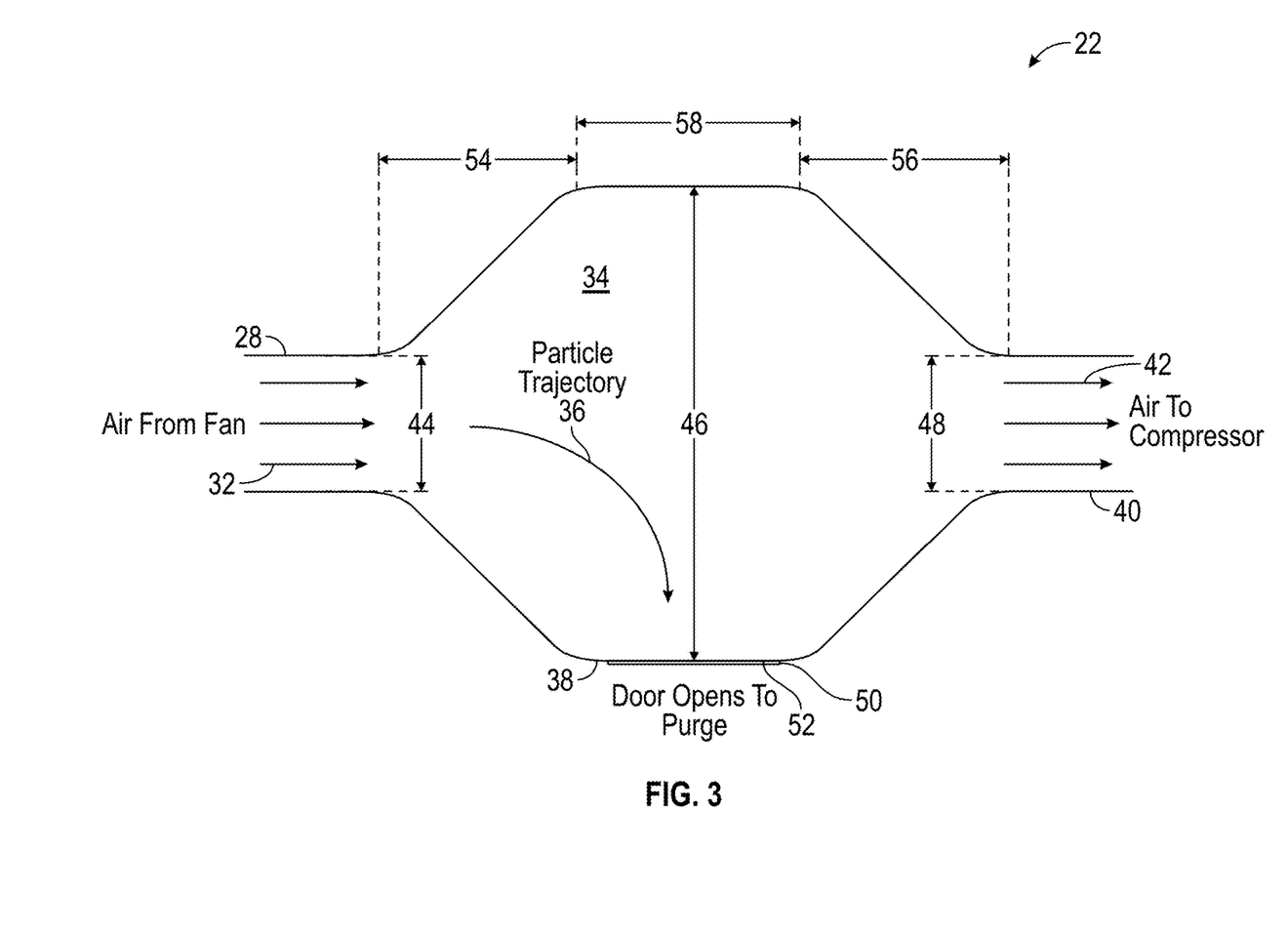
FIG. 3 is an enlarged view of the particle decelerator illustrated in FIG. 2.

FIG. 3 is an enlarged view of the particle decelerator 22 of FIG. 2. As illustrated, air from the fan 12 travels into the particle decelerator 22 via conduit or passage 28 and is illustrated by arrows 32. Also shown is that the particle decelerator 22 has a receiving area 34 with an area or cross-sectional area that is greater than the area or cross-sectional area of inlet passage or conduit 28. As mentioned above, the air following into conduit or passage 28 may contain sand and/or other particles and/or objects that are entrained in the air flow depicted by arrows 32. However and as this air enters the enlarged area or receiving area 34 of the particle decelerator 22, the velocity of said particles and/or objects will be reduced or decelerated such that the particles and/or objects will no longer be entrained in the air path and will have a particle trajectory illustrated by arrow 36 due to gravity forces towards an outer shell or wall 38 of the receiving area 34 of the particle decelerator 22.

The air traveling into the particle decelerator 22 will continue through the receiving area 34 into an exit conduit or passage 40 in fluid communication with receiving area 34. However, this air illustrated by arrows 42 will not have the aforementioned particles and/or objects as they will have dropped off in the direction of arrow 36 due to their reduced velocity and gravity forces. In one embodiment, the inlet conduit or passage 28 and the outlet conduit or passage 40 will have the same area or cross-sectional area while the area of the receiving area 34 is larger than that of the inlet conduit or passage 28 and the outlet conduit or passage 40. These areas are illustrated in non-limiting fashion by arrows 44, 46 and 48.

Moreover and in one embodiment, the outer shell or wall 38 of the receiving area 34 of the particle decelerator 22 may be configured to have an opening 50 with a door 52 located therein to allow for purging or removal of the accumulated particles and/or objects that have fallen downwardly in the direction of arrow 36. In one embodiment, this door 52 may be pivotally secured to the outer shell 38 such that opening 50 may be sealed and unsealed due to the position of door 52 (e.g., either opened or closed). The door 52 may be configured to be opened when there is no airflow through particle decelerator 22 in order to allow for ease of particle purging. Alternatively, the door 52 may be opened when air is flowing through the particle decelerator 22 during a purging operation of the engine 10.

Still further and in yet another embodiment, the receiving area 34 of the particle decelerator 22 may have transition areas 54 and 56 located between a central area 58 of the receiving area 34 and the inlet 28 and the outlet 40 passages.

In one embodiment, there is no pressure loss of the fluids or air travelling from inlet passage 28 into receiving area 34 and ultimately to outlet passage 40 as door 52 is sealed about opening 50 via a gasket or any other suitable material in order to provide a sealed particle decelerator 22.

Accordingly and as air travels from inlet conduit or passage 28 into receiving area 34 and into outlet conduit or passage 40, particles are captured in receiving area 34 of particle decelerator 22. As illustrated in FIGS. 2 and 3, the air or fluid received in conduit or passage 40 has had particles and/or objects removed therefrom due to particle decelerator 22 and travels on towards the compressor 16 of the gas turbine engine 10.

Figure 4:
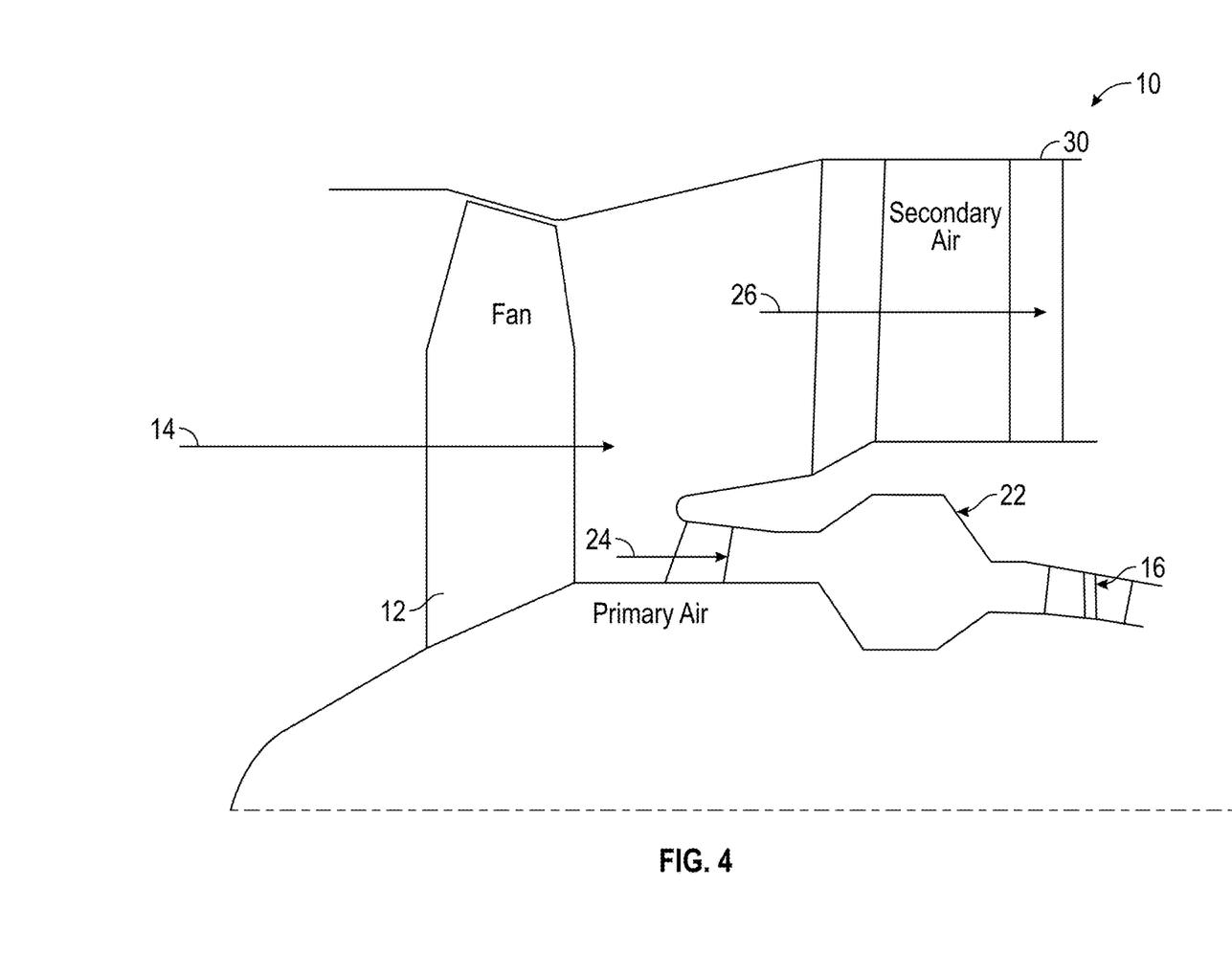
FIG. 4 is a partial cross-sectional view of a gas turbine engine illustrating a particle decelerator in accordance with an alternative embodiment of the disclosure.
Figure 5A:
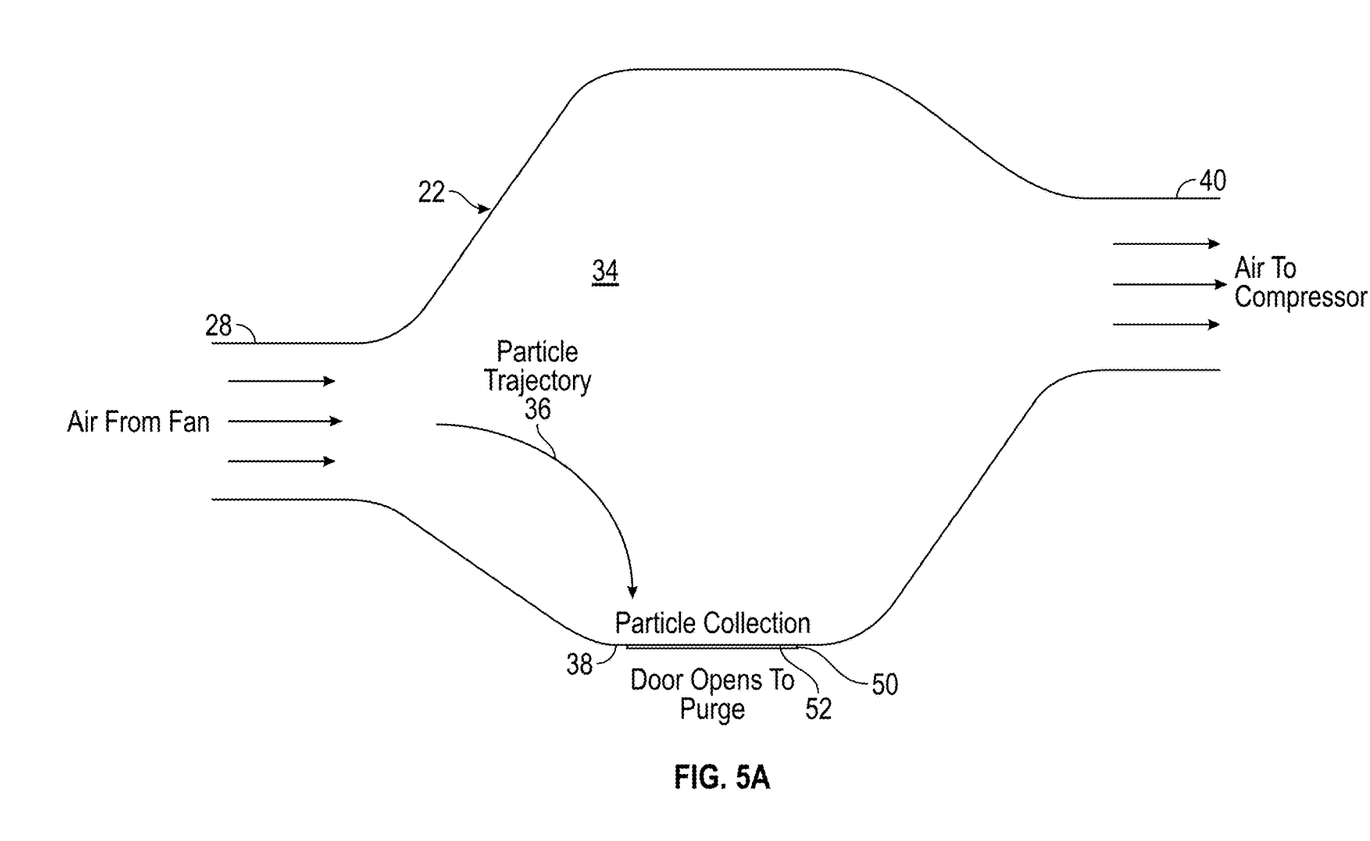
FIGS. 5A and 5B are enlarged views of the particle decelerator illustrated in FIG. 4.
Figure 5B:
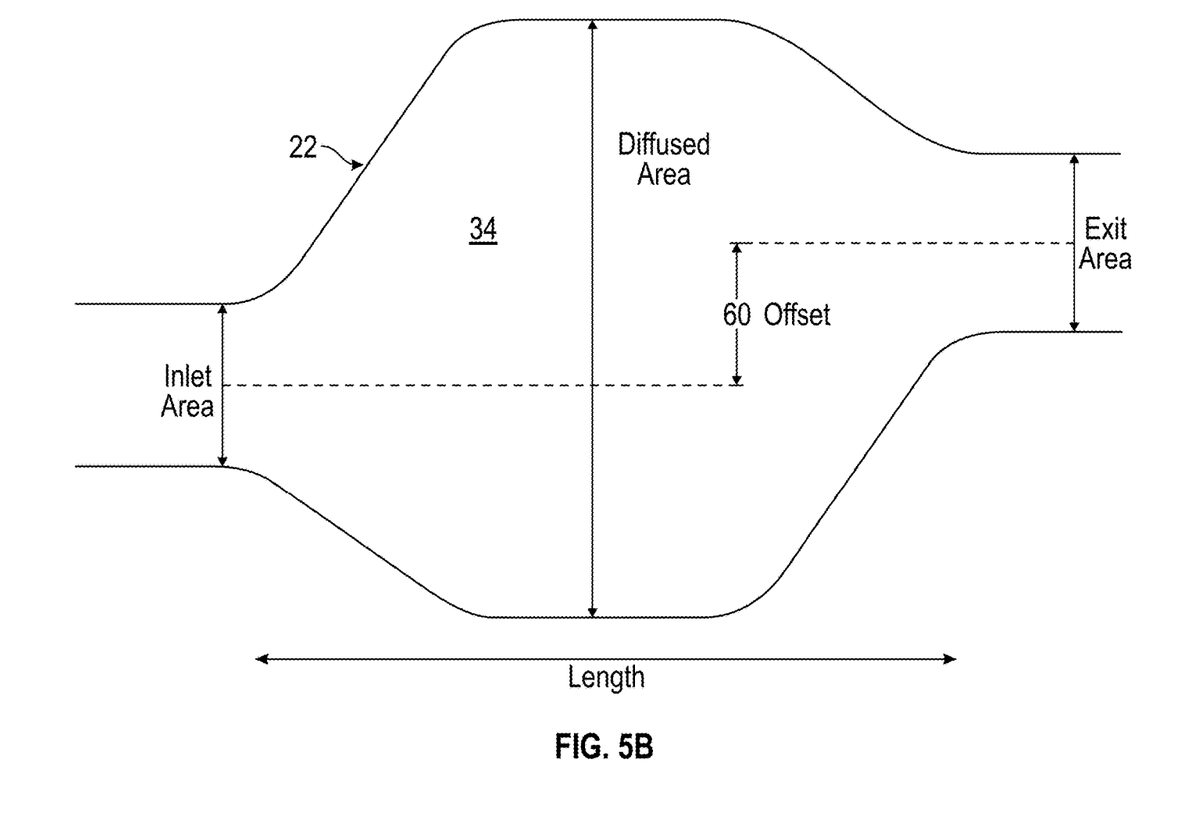

Referring now to FIGS. 4, 5A and 5B, an alternative embodiment of the present disclosure is illustrated. Here, the particle decelerator 22 is configured such that the inlet conduit or passage 28 is offset from the outlet conduit or passage 40. In other words, the receiving area 34 and/or transition areas 54 and 56 are configured such that the air flow path from the inlet conduit or passage 28 is offset from the outlet conduit or passage 40, which is illustrated by arrows 60. Still further this offset (illustrated by arrows 60) may also be referred to as the center line of the inlet conduit or passage 28 is offset from the center line of the outlet conduit or passage 40.

Accordingly and not only will particles and/or objects drop off in the direction of arrow 36 due to the enlarged area of the diffuser 22, they will also be collected at the outer shell 38 as the offset illustrated by arrows 60 will further cause the particles and/or objects to drop downwardly in the direction of arrow 36. In similar fashion, a door 52 allows for particles and/or objects to be removed from area 34 via opening 50.

Figure 6:
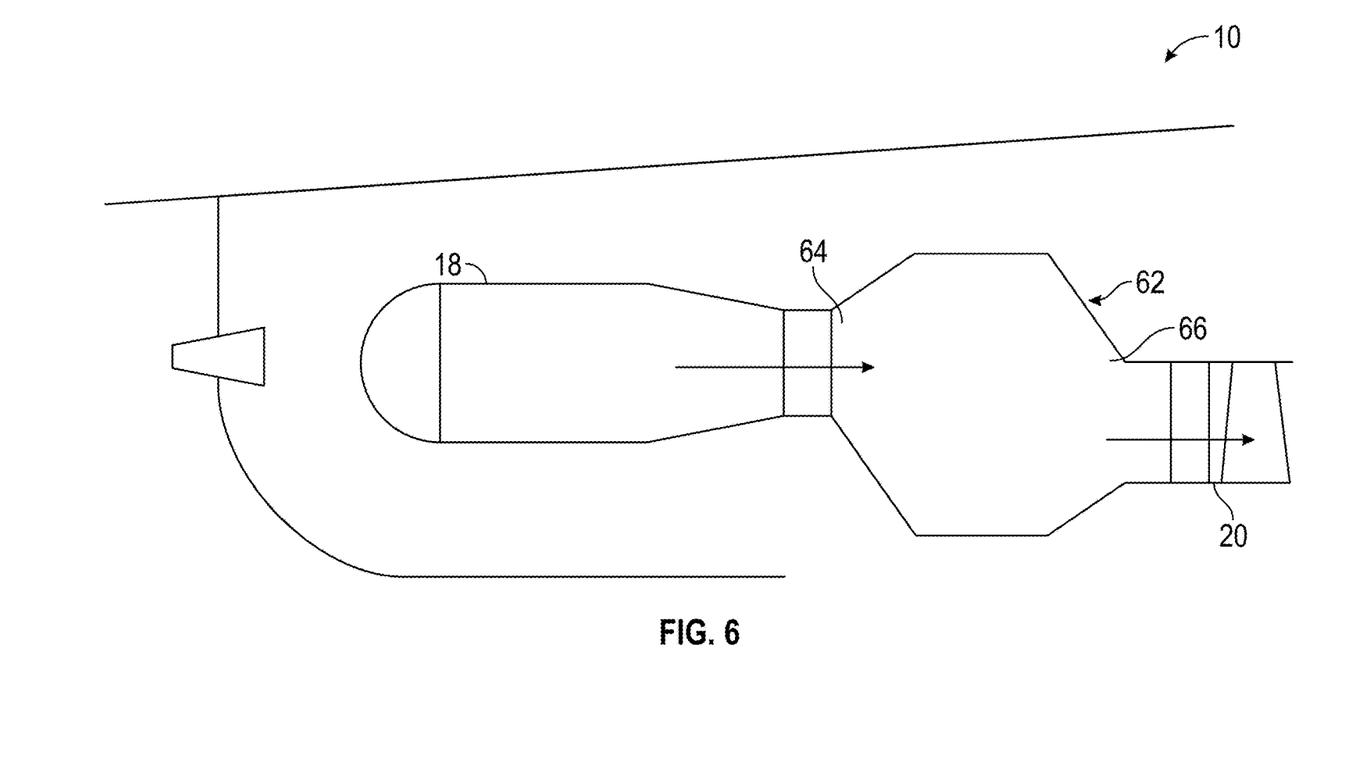
FIG. 6 is a partial cross-sectional view of a gas turbine engine illustrating a particle decelerator in accordance with yet another alternative embodiment of the disclosure.

Referring now to FIG. 6 an alternative embodiment of the disclosure is illustrated. Here a particle decelerator 62 is located downstream of the combustor 18 and upstream of the turbine 20. In one embodiment, the particle decelerator 62 may be located in the area "B" depicted in FIG. 1. As illustrated, the particle decelerator 62 may be configured as an annular area disposed about a center line or axis 23 of the gas turbine engine 10. Accordingly, an inlet 64 of the particle decelerator 62 is fluidly coupled to the outlet of the combustor 18 and an outlet 66 of the particle decelerator 62 is fluidly coupled to an inlet of the turbine 20. In this embodiment, the particle decelerator 62 is configured to capture particles and/or objects located or entrained in the air exiting from the combustor 18, which may be particles and/or objects other than those located in the air when it is initially received by the engine 10 for example, objects or particles generated internally by the engine 10 or alternatively the particles and/or objects may comprise both particles and/or objects located or entrained in the air exiting from the combustor 18 and particles and/or objects located in the air when it is initially received by the engine 10. As used herein, particle decelerator refers in a non-limiting fashion to an area configured to slow the velocity particles and/or objects traveling in an air path passing into the particle decelerator such that they are captured in the particle decelerator.

Figure 7:
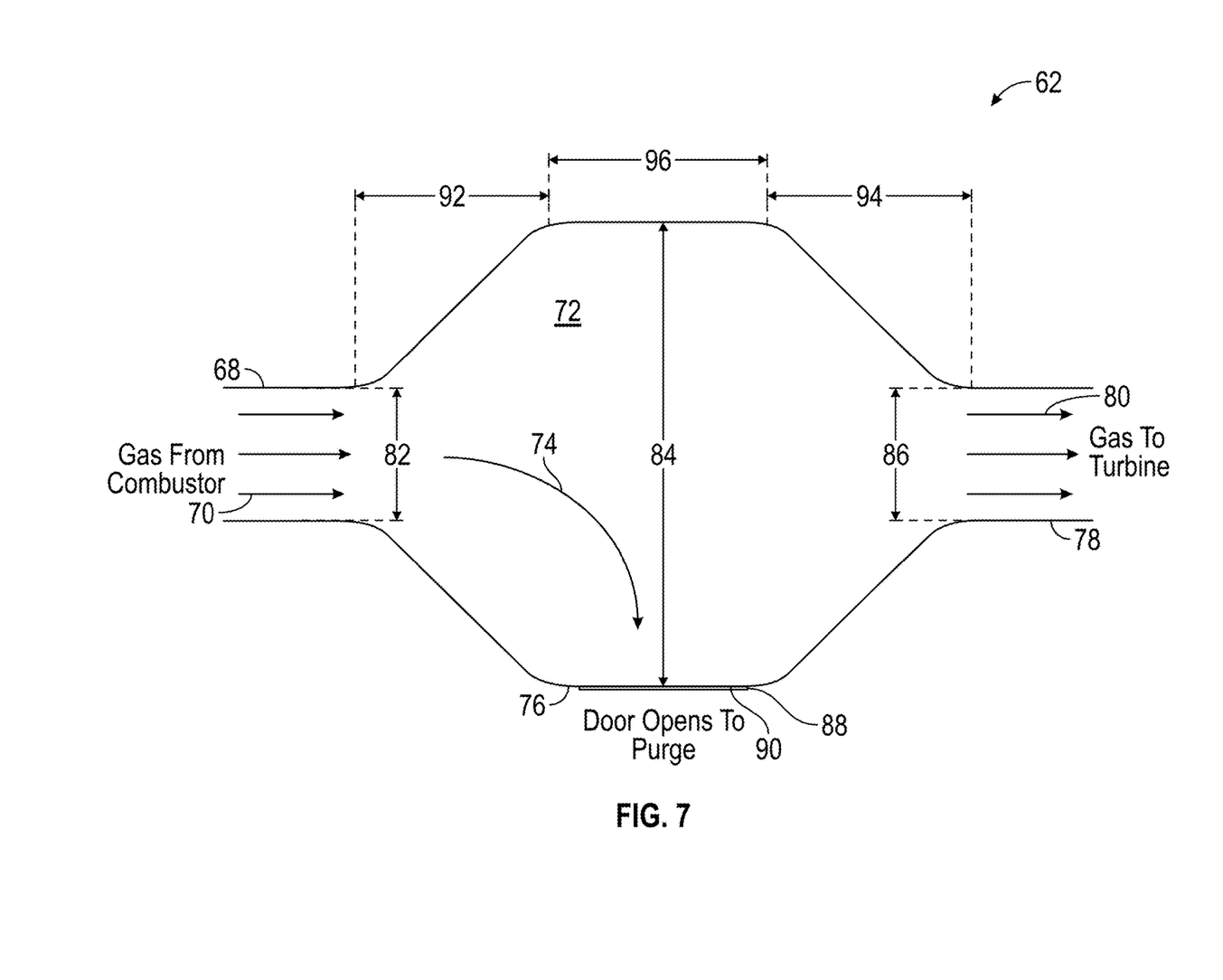
FIG. 7 is an enlarged view of the particle decelerator illustrated in FIG. 6.

FIG. 7 is an enlarged view of the particle decelerator 62 of FIG. 6. As illustrated, air or fluid from the combustor 18 travels into the particle decelerator 62 via conduit or passage 68 and is illustrated by arrows 70. Also shown is that the particle decelerator 62 has a receiving area 72 with an area or cross-sectional area that is greater than the area or cross-sectional area of inlet passage or conduit 68. As mentioned above, the air following into conduit or passage 68 may contain particles and/or objects that are entrained in the air flow depicted by arrows 70. However and as this air enters the enlarged area or receiving area 72 of the particle decelerator 62, the velocity of the particles and/or objects will be reduced or decelerated such that the particles and/or objects will no longer be entrained in the air path and will have a particle or object trajectory illustrated by arrow 74 towards an outer shell or wall 76 of the receiving area 72 of the particle decelerator 62.

The air traveling into the particle decelerator 62 will continue through the receiving area 72 into an exit conduit or passage 78 in fluid communication with receiving area 72. However, this air illustrated by arrows 80 will not have the aforementioned particles and/or objects as they will have dropped off in the direction of arrow 74 due to their reduced velocity and gravity forces. In one embodiment, the inlet conduit or passage 68 and the outlet conduit or passage 78 will have the same area or cross-sectional area while the area of the receiving area 72 is larger than that of the inlet conduit or passage 68 and the outlet conduit or passage 78. These areas are illustrated in non-limiting fashion by arrows 82, 84 and 86.

Moreover and in one embodiment, the outer shell or wall 76 of the receiving area 72 of the particle decelerator 62 may be configured to have an opening 88 with a door 90 located therein to allow for purging or removal of the accumulated particles and/or objects that have fallen to the outer shell 76. In one embodiment, this door 90 may be pivotally secured to the outer shell 76 such that opening 88 may be sealed and unsealed due to the position of door 90 (e.g., either opened or closed). The door 90 may be configured to be opened when there is no airflow through particle decelerator 62 in order to allow for ease of particle or object purging. Alternatively, the door 90 may be opened when air is flowing through the particle decelerator 62 during a purging operation of the engine 10.

Still further and in yet another embodiment, the receiving area 72 of the particle decelerator 62 may have transition areas 92 and 94 located between a central area 96 of the receiving area 72 and the inlet 68 and the outlet 78 passages.

In one embodiment, there is no pressure loss of the fluids or air travelling from inlet passage 68 into receiving area 72 and ultimately to outlet passage 78 as door 90 is sealed about opening 88 via a gasket or any other suitable material in order to provide a sealed particle decelerator 62.

Accordingly and as air travels from inlet conduit or passage 68 into receiving area 72 and into outlet conduit or passage 78, particles are captured in receiving area 72 of particle decelerator 62. As, illustrated in FIGS. 6 and 7, the air or fluid received in conduit or passage 78 has had particles or objects removed therefrom due to particle decelerator 62 and travels on towards the compressor 20 of the gas turbine engine 10.

Figure 8A:
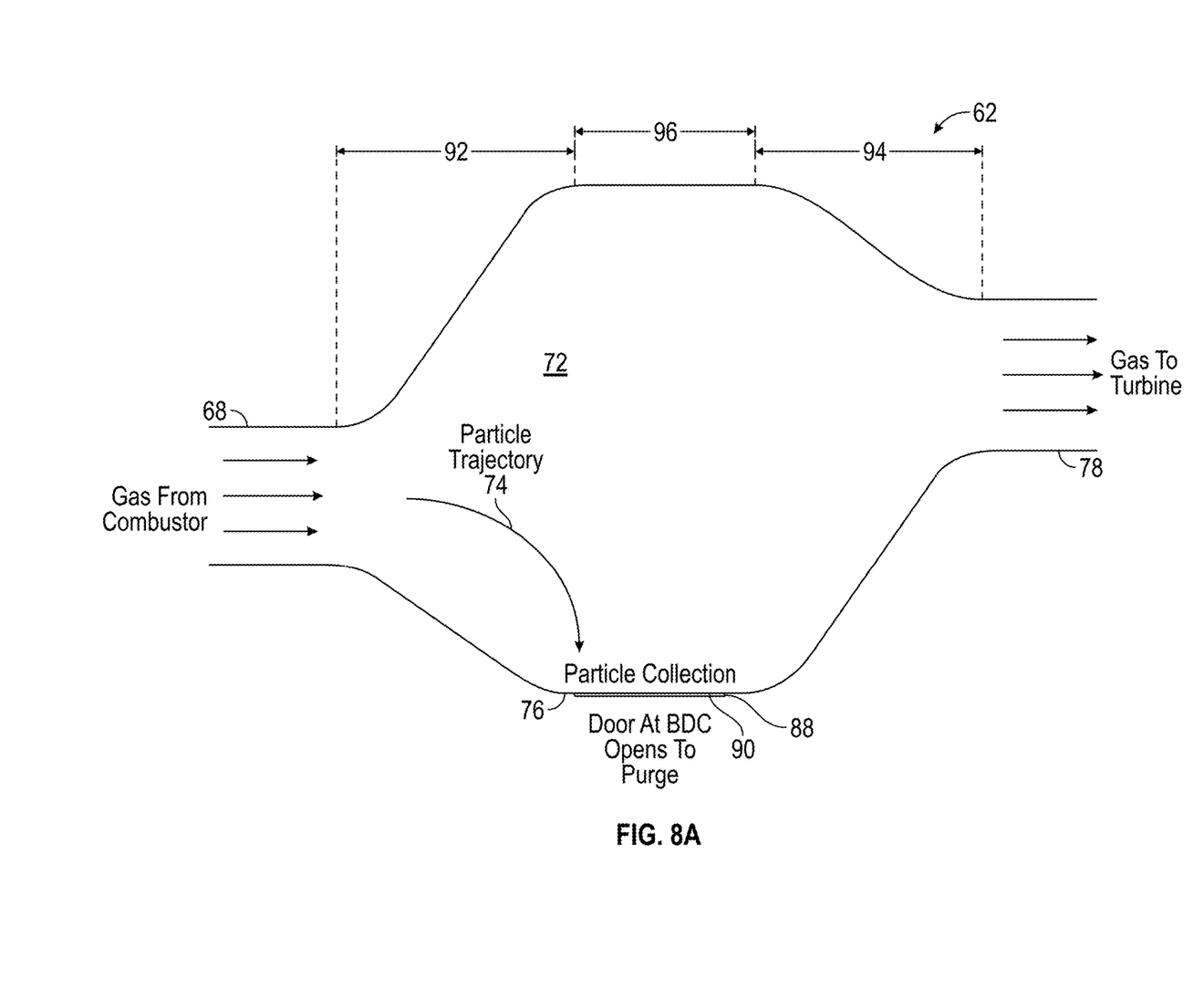
FIGS. 8A and 8B are enlarged views of a particle decelerator illustrated in FIG. 6 in accordance with an alternative embodiment.
Figure 8B:
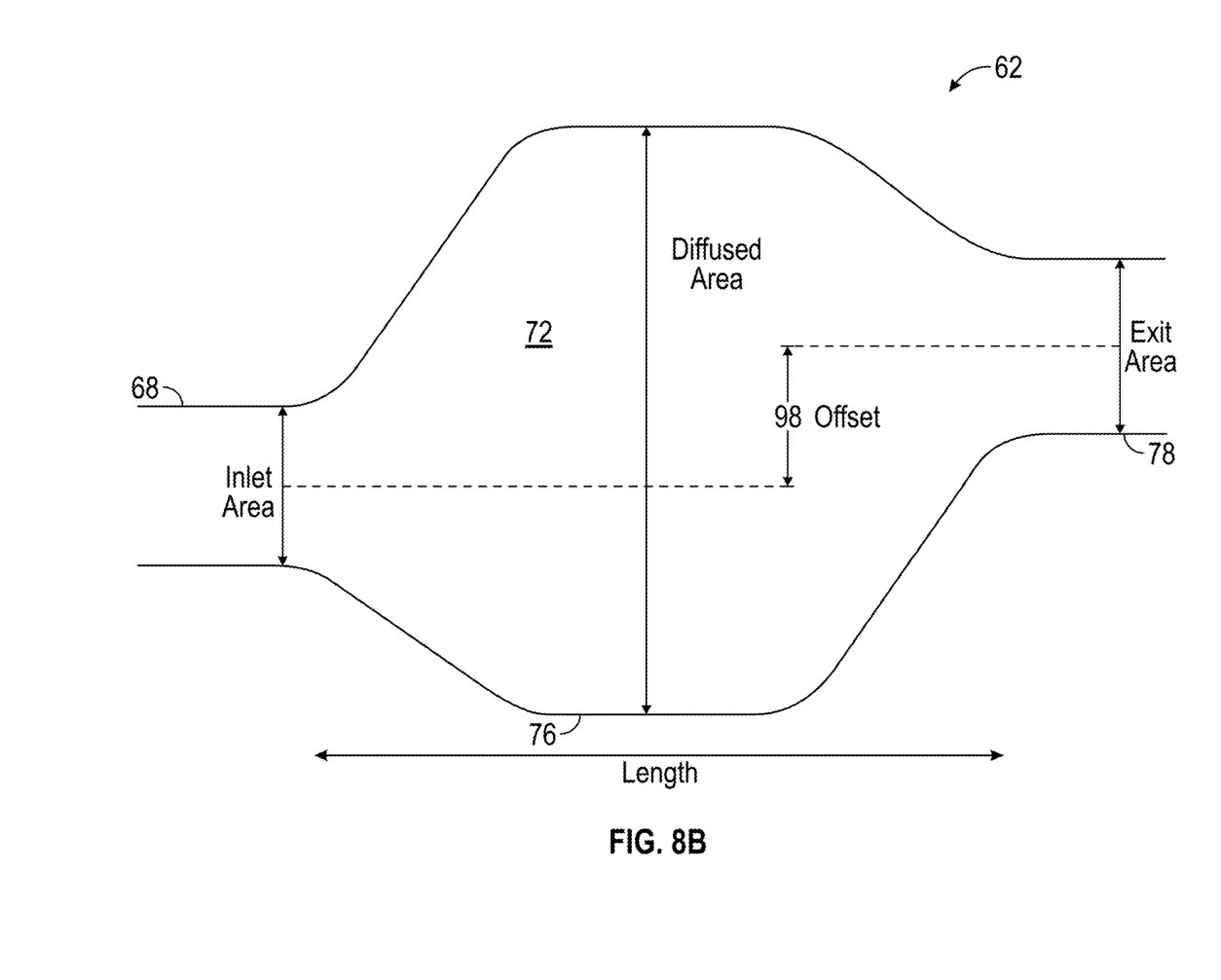

Referring now to FIGS. 8A and 8B, an alternative embodiment of the present disclosure is illustrated. Here, the particle decelerator 62 is configured such that the inlet conduit or passage 68 is offset from the outlet conduit or passage 78. In other words, the receiving area 72 and/or transition areas 92 and 94 are configured such that the air flow path from the inlet conduit or passage 68 is offset from the outlet conduit or passage 78, which is illustrated by arrows 98. Still further this offset (illustrated by arrows 98) may also be referred to as the center line of the inlet conduit or passage 68 that is offset from the center line of the outlet conduit or passage 78.

Accordingly and not only will particles and/or objects drop off in the direction of arrow 74 due to the enlarged area of the diffuser 62 they will also be collected at the outer shell 76 as the offset illustrated by arrows 98 will further cause the particles and/or objects to drop downwardly in the direction of arrow 74.

Still further and referring to FIGS. 1-8A, the gas turbine engine 10 may be configured to have either particle decelerator 22 or 62 each being configured to have an offset flow path or a simply a straight through flow path. In yet another embodiment, the gas turbine engine 10 may be configured to have both particle decelerators 22 and 62, wherein one is located before the compressor and one is located before the turbine. As mentioned above the decelerators may be configured to have an offset flow path or a simply a straight through flow path. In one non-limiting embodiment, the particle decelerators 22 and 62 may be configured to slow the velocity of the particles and/or objects in a range of 1 micron to 10 millimeters that are traveling in an air path passing into the particle decelerator(s) such that they are captured in the particle decelerator(s). Of course, various embodiments of the disclosure are contemplated for use in capturing particles and/or objects having dimensions outside the aforementioned range and/or located within smaller nested ranges that may be within the aforementioned range or have a portion of the smaller range within the aforementioned range.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A gas turbine engine, comprising:
 a turbine;
 a combustor for directing air towards the turbine of the gas turbine engine; and
 a particle decelerator located between the combustor and the turbine such that air directed towards the turbine from the combustor must travel through the particle decelerator and wherein an area of the particle decelerator is greater than an area of an inlet and an outlet of the particle decelerator, and wherein the outlet of the particle decelerator is fluidly coupled to an inlet of the turbine; and
 wherein the particle decelerator is configured to decelerate particles and objects located in the air travelling in the particle decelerator such that they are retained in the particle decelerator.

2. The gas turbine engine of claim 1, further comprising:
 a compressor;

an inlet opening for directing air towards the compressor of the gas turbine engine;
a second particle decelerator located between the inlet opening and the compressor such that air travelling towards the compressor from the inlet opening must travel through the second particle decelerator and wherein an area of the second particle decelerator is greater than an area of the inlet and an outlet of the second particle decelerator.

3. The gas turbine engine of claim 2, the gas turbine engine further comprises a fan for directing the air to the compressor and wherein the engine has a primary air flow path from the fan to the second particle decelerator and a secondary air flow path from the fan and away from the second particle decelerator and wherein the gas turbine engine is configured for use in an aircraft.

4. The gas turbine engine of claim 2, wherein the area of the particle decelerator and/or the second particle decelerator further comprises a transition area located between the inlet and the outlet of the particle decelerator and/or the second particle decelerator and wherein the area of the particle decelerator and/or the second particle decelerator is an annular area located about an axis of the gas turbine engine.

5. The gas turbine engine of claim 2, wherein the particle decelerator and/or the second particle decelerator further comprises an opening located in an outer shell of the particle decelerator and/or the second particle decelerator, and a door for sealing the opening in the outer shell of the particle decelerator and/or the second particle decelerator.

6. The gas turbine engine of claim 2, wherein the particle decelerator and/or the second particle decelerator is configured such that the inlet is offset from the outlet such that an air flow path from the inlet is offset from the outlet.

7. The gas turbine engine of claim 6, wherein the area of the particle decelerator and/or the second particle decelerator further comprises a transition area located between the inlet and the outlet of the particle decelerator and/or the second particle decelerator.

8. The gas turbine engine of claim 6, wherein the particle decelerator and/or the second particle decelerator further comprises an opening located in an outer shell of the particle decelerator and/or the second particle decelerator, and a door for sealing the opening in the outer shell of the particle decelerator and/or the second particle decelerator.

9. The gas turbine engine of claim 2, further comprising a primary air flow path from the fan to the second particle decelerator and a secondary air flow path from the fan and away from the second particle decelerator.

10. The gas turbine engine of claim 2, wherein an area of the particle decelerator further comprises a transition area located between the inlet and the outlet of the particle decelerator and wherein the second particle decelerator further comprises a transition area located between the inlet and the outlet of the second particle decelerator and wherein the area of the particle decelerator is an annular area located about an axis of the gas turbine engine.

11. The gas turbine engine of claim 2, wherein the particle decelerator further comprises an opening located in an outer shell of the particle decelerator, and a door for sealing and closing the opening in the outer shell of the particle decelerator and wherein the second particle decelerator further comprises an opening located in an outer shell of the second particle decelerator, and a door for sealing the opening in the outer shell of the second particle decelerator.

12. The gas turbine engine of claim 2, wherein the particle decelerator is configured such that the inlet of the particle decelerator is offset from the outlet of the particle decelerator such that an air flow path from the inlet of the particle decelerator is offset from the outlet of the particle decelerator and wherein the second particle decelerator is configured such that the inlet of the second particle decelerator is offset from the outlet of the second particle decelerator such that an air flow path from the inlet of the second particle decelerator is offset from the outlet of the second particle decelerator.

13. The gas turbine engine of claim 12, wherein the area of the particle decelerator and the area of the second particle decelerator further comprises a transition area located between the inlet and the outlet of the particle decelerator and the second particle decelerator.

14. The gas turbine engine of claim 13, wherein the particle decelerator further comprises an opening located in an outer shell of the particle decelerator, and a door for sealing the opening in the outer shell of the particle decelerator and wherein the second particle decelerator further comprises an opening located in an outer shell of the second particle decelerator, and a door for sealing the opening in the outer shell of the second particle decelerator.

15. The gas turbine engine of claim 1, wherein the particle decelerator further comprises a transition area located between the inlet and the outlet of the particle decelerator and wherein the gas turbine engine is configured for use in an aircraft.

16. The gas turbine engine of claim 1, wherein the particle decelerator further comprises an opening located in an outer shell of the particle decelerator, and a door for sealing the opening in the outer shell of the particle decelerator.

17. The gas turbine engine of claim 1, wherein the particle decelerator is configured such that the inlet is offset from the outlet such that an air flow path from the inlet is offset from the outlet and wherein the area of the particle decelerator further comprises a transition area located between the inlet and the outlet of the particle decelerator.

18. A method for removing at least one of particles and objects from an air flow path of a gas turbine engine, comprising:
    directing air from a combustor towards a turbine of the gas turbine engine, wherein a particle decelerator is located between the combustor and the turbine such that the air directed from the combustor towards the turbine must travel through the particle decelerator first and wherein an area of the particle decelerator is greater than an area of an inlet and an outlet of the particle decelerator; and
    decelerating a velocity of at least one of particles and objects located in the air travelling in the particle decelerator such that the at least one of the particles and objects are retained in the particle decelerator.

19. The method as in claim 18, wherein the gas turbine engine is configured for use in an aircraft and wherein the gas turbine engine further comprises a second particle decelerator located between a fan and a compressor of the gas turbine engine, wherein the method further comprises:
    directing air from the fan of the gas turbine engine towards the compressor of the gas turbine engine; and
    decelerating a velocity of at least one of particles and objects located in the air travelling in either the particle decelerator or the second particle decelerator such that at least one of the particles and objects are retained in the particle decelerator or the second particle decelerator.

* * * * *